UNITED STATES PATENT OFFICE.

RALPH W. KING, OF THE DALLES, OREGON, ASSIGNOR TO PACIFIC EVAPORATOR COMPANY, A CORPORATION OF OREGON.

EVAPORATED APPLES.

1,259,636.     Specification of Letters Patent.     Patented Mar. 19, 1918.

No Drawing.     Application filed June 29, 1917. Serial No. 177,814.

*To all whom it may concern:*

Be it known that I, RALPH W. KING, a citizen of the United States, residing at The Dalles, in the county of Wasco and State of Oregon, have invented new and useful Improvements in Evaporated Apples, of which the following is a specification.

This invention relates to evaporated apples and consists of certain improvements therein, as will be hereinafter fully described and pointed out in the claims.

The object in question is to produce an evaporated apple which will more nearly assume its natural color and quality when subjected to moisture.

In producing evaporated apples in accordance with my invention I utilize the following process:

The apples are peeled and cored and subjected to a salt solution, the salt being preferably ordinary table salt or sodium chlorid, the solution best adapted for the purpose being a three per cent. solution.

The apples are sliced and immediately subjected to a bleaching agent, such as sulfur fumes. If this cannot be immediately accomplished, the fruit is again subjected to a salt solution until it is convenient to subject it to the sulfur fumes. The fruit is then evaporated by subjecting it to a current of air, preferably below a temperature of 156° Fahrenheit. This is the temperature at which cooking or breaking down of the cells begins, and is desirable to prevent the cooking action in order that the fruit when again subjected to moisture will assume its natural quality.

By this process a product is produced in which the discoloration ordinarily found in evaporated apples is entirely avoided. The quality as to taste is very closely preserved in that the fruit cells are not broken down; in other words, the fruit is uncooked. It has been a common practice in evaporating apples to subject them to high temperature to prevent discoloration. In this process this is unnecessary. The fruit throughout the process is at no time subjected to a temperature sufficient to cook or break down the cells. The temperature should be above 125° Fahrenheit, preferably about 145° Fahrenheit.

What I claim as new is:

1. As an article of manufacture an apple having discoloration arrested by the combined action of a salt solution and a fuming agent and in which the moisture is removed by evaporation.

2. As an article of manufacture an uncooked apple having discoloration arrested by the combined action of a salt solution and a fuming agent and in which the moisture is removed by evaporation.

In testimony whereof I hereunto set my hand.

RALPH W. KING.